Aug. 18, 1953     G. DARRIEUS     2,649,266
FAIRING FOR HIGH-SPEED DEVICES
Filed July 18, 1947

Inventor:
Georges Darrieus,
By
Pierce, Scheffler + Parker,
Attorneys.

Patented Aug. 18, 1953

2,649,266

UNITED STATES PATENT OFFICE 2,649,266

FAIRING FOR HIGH-SPEED DEVICES

Georges Darrieus, Maunoury, Houilles, France, assignor to Compagnie Electro-Mecanique, Paris, France, a body corporate of France Application July 18, 1947, Serial No. 761,777
In France March 24, 1945

Section 1, Public Law 690, August 8, 1946
Patent expires March 24, 1965

8 Claims. (Cl. 244—130)

This invention relates to fairings for high speed devices such as speed boats, artillery shells, or self-propelled rockets and aircraft adapted to travel at up to and supersonic speeds.

While not limited thereto, the invention is particularly useful as applied to bodies operating at or near supersonic speeds as experience has shown that the major portion of the resistance to travel is no longer due, as in the case of lower speeds, to friction and turbulence (boundary layer and wake losses) but to the radiation of kinetic energy as shock waves set up by travel of the fairing through an elastic medium. A part of this energy may be immediately dissipated as heat, as in the case of friction losses, but the major part which is radiated into space constitutes a substantial component of the total resistance to high speed travel.

Objects of the present invention are to provide fairings, and high speed devices having fairings, which suppress the radiation of energy as shock waves, thereby reducing the resistance to high speed travel substantially to the magnitudes due to viscosity effects such as encountered in the case of low speeds. An object is to provide fairing which suppresses shock waves or pressure discontinuities which would, if established, produce an increase in entropy, a non-reversible phenomenon which leads to a loss in useful energy. Other objects are to provide fairings which include, in addition to the profile or surface of the high speed body, shields for reflecting pressure waves back to the body and thus recovering the kinetic energy present in such waves. More specifically, objects are to provide fairings for bodies adapted to travel at high speeds, including supersonic speeds; such a fairing constituting a surface of revolution which is symmetrical about a median plane normal to the axis of the body, and a cylindrical shield spaced radially from the surface of revolution to reflect pressure waves back thereto. Further objects are to provide fairings of the type last stated in which the cylindrical shield may be secured to the body in the case of a rocket missile or similar device, or may be a guide tube or channel in the case of a pneumatic dispatch system or similar equipment. Other objects are to provide fairings for high speed boats which eliminate the radiation of pressure waves.

These and other objects and the advantages of the invention will be apparent from the following specification when taken with the accompanying drawings in which.

Figure 1:
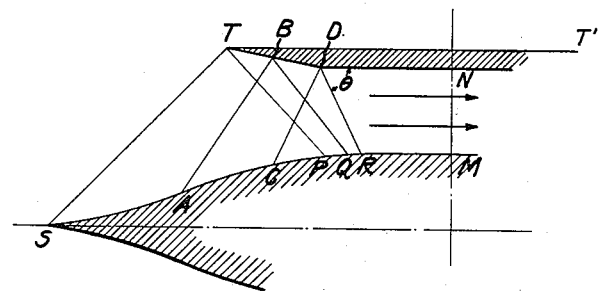
Fig. 1 is a fragmentary diagram of an axial section through a fairing embodying the invention, the paths of elementary pressure waves being shown in the diagram.
Figures 2, 3:
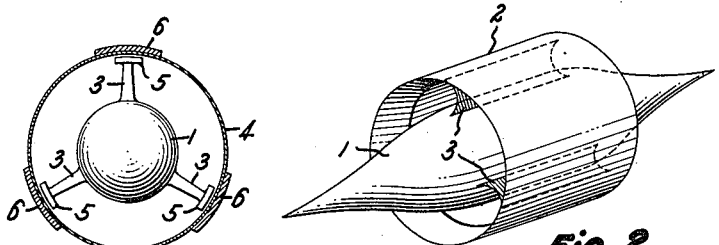
Fig. 2 is a perspective view of a fairing such as shown diagrammatically in Fig. 1.
Fig. 3 is a transverse section through a high speed system in which mail, freight or passengers are transported through a tube or tunnel in cars having fairings embodying the invention.

Referring to Figs. 1 and 2, the forward portion of the fairing 1, which forms a housing about or for such devices as artillery shells, self-propelled rockets and aircraft, and has the surface of a body of revolution is very sharply pointed with an angle at the tip S which theoretically is zero and practically is very small and flares gradually to the maximum cross-section at point M. The compression produced in a fluid by the high speed travel of the fairing is thus developed in a continuous manner in accordance with the elementary Sarrau-Mach waves corresponding to the characteristic curve disclosed in the mathematical theory of the problem. In Fig. 1, the lines ST, AB, CD show the paths of elementary pressure waves belonging to that one of the two families which may be considered as starting along the outline SACM; such waves representing energy radiated from the fairing 1. The contour or profile of the surface of rotation is concave at the forward portion where it flares gradually from the sharply pointed tip S, and the curvature of the profile reverses some distance back from the tip, at approximately point A as shown, to merge smoothly into the convex surface portion which flares smoothly into the maximum cross-section surface at point M.

In order to prevent this energy from being lost into space, the outward progression of the waves ST to CD is intercepted in accordance with the invention by reflecting them inwardly by an imperforate cylindrical shield T—T', the wave elements following paths indicated by lines TP, BQ, DR, respectively.

The condition that the screen T—T' should produce on its part no outwardly directed wave is satisfied by making the generating lines of the shield parallel to the axis of the body and to the direction of movement. The necessity of preventing shock waves requires, in the same manner as for the central body, that the end of the shield be a surface of revolution with a sharp edge at the outer cylindrical surface. The pitch or slope of the surface TBD is relatively sharp with the rear edge, or junction with the inner cylindrical surface of the shield, located well in advance of the maximum cross-section zone M of the body 1.

The front portion SAC of the profile of the fairing may be in principle chosen at will, provided on one hand that the angle at the apex S is sufficiently small to produce only a negligible shock wave and on the other hand that the elementary waves starting from this forward zone do not by reason of their convergent character throughout the useful field including that of the reflected waves consolidate inside this shield to degenerate into a shock wave of finite amplitude, which shock wave would introduce into the fluid stream the fundamental non-reversibility and an increase of entropy.

The profile is no longer arbitrary beyond a certain point C at which originates the last pressure wave CD which is reflected back, at a Mach angle $\theta$ to the axis, from the conical or approximately conical end surface TD of the shield. The profile from point C to point M, where the annular fluid path has its normal or minimum cross-section, is subject to the condition that the fluid flow beyond the pressure wave CD should satisfy certain requirements, and the profile may be determined according to the theory of partial derivative equations of the hyperbolic type which define the problem. The requirement may be, for example, that the direction of flow across a normal cross-section, such as that indicated by line MN, be parallel to the axis of the body 1, whereby the plane indicated by line MN may be a plane of symmetry for the fluid flow. Or the requirement may be that the last pressure wave DR reflected back to the profile finish the transformation of the fluid flow into a uniform stream parallel to the axis, as was the original stream, but with a higher pressure; whereby the profiled portion SACM of the body and its shield portion TD act in the same manner as the second convergent portion of a nozzle with a double throat.

The slope and the curvature of the part SAC, which is the arbitrarily designed part of the profile, and also those of the portion TD of the shield may always be designed in a manner such that on one hand the comparatively inactive zone, as concerns the increase in pressure, extending between the starting point C of the last reflected wave CD and the return point P of the first reflected wave TP is not too great, and on the other hand so that the relative close location of the points PQR at which the reflected wave elements impinge on the body 1 do not produce too high a pressure gradient in this zone.

The suction of the boundary layer which results of course from the removal of combustion air from a suitable portion of the surface of body 1, as required for the operation of self-propelling devices such as rockets operating for instance through reaction jets, permits a high gradient of pressure inside the suction zone without risk of a pressure discontinuity.

Either of the above-stated requirements as to flow beyond line CD, or even in the second case of flow at any plane of normal cross-section, satisfies the condition that the energy conversion be isentropic, i. e. that the energy represented by the non-turbulent stream of high pressure fluid at a transverse plane of normal cross-section may be recovered, except for friction losses localized at the boundary layers, by continuing the flow down-stream along a path symmetrical with that of fluid flow to the transverse plane. The conditions for energy recovery are more favorable than those for an efficient conversion of pressure-energy to velocity-energy at the forward portion of the fairing since the rear portion of the fairing acts as a divergent nozzle.

Consequently, no account being taken of the wake near the central body and near the shield as defined down stream by the gathering of the boundary layers, the fairing corresponds, at least as concerns the suppression of the resistance due to pressure waves and to shape, to an ideal fairing satisfying d'Alembert's paradox at supersonic speeds. Furthermore, the friction effects, i. e. the wake, may be suppressed as to their mechanical manifestation (unequal speeds and kinetic energy remaining in the wake) in the case of a fairing propelled at uniform speed and for which the driving means, such as a propeller or ejector suitably arranged in the wake, is limited in its use to compensate for the losses of momentum in the boundary layers. These friction effects may in fact be done away with even in their thermodynamic appearances as a rise in temperature and a reduction in the specific weight of the air stream forming the wake through a cooling obtained through the storing of the fuel, hydrocarbon, liquefied hydrogen, and the like, under a state and at a low temperature capable of contributing a certain supplement of useful energy in addition to its intrinsic calorific power.

The application of all the steps defined hereinabove will allow, in principle, the development of a self-propelled fairing adapted to move through air at a predetermined speed which may be as high as desired, without leaving any more trail, such as a wake or noise due to the shock waves or the like, of its passage in the fluid which is returned downstream to its initial state to a substantially perfect extent, than an ideal fairing leaves inside a perfect fluid.

Of course, practical considerations may lead to a discarding to a greater or less extent of these theoretical optimum conditions without any change in the principles underlying the invention.

Thus the radial ribs 3 which connect the central body to the cylindrical shield or shields T—T', although they should be in principle of an infinitely thin cross-section, are in practice of a minimum thickness consistent with the requirements of operation and of mechanical strength.

The main thing is that the additional resistance due to the residual shock waves which may be produced by ribs 3 by reason of their low lift-drag ratio may be small with reference to the corresponding resistance of a central body 1 without the above-described shield T—T'.

Among the possible applications of the invention, but without limitation by this enumeration, are missiles such as high speed shells propelled through inertia after the manner of the usual artillery projectiles or through reaction as in the case of rockets, aerial torpedoes and the like, and also of aircraft which are more rapid than the aircraft of today and show a lesser resistance by reason of the reduction both of the surfaces such as wings outside the fuselage and of the induced resistance even in the case of very high loads on the carrier surfaces which may be constituted in a large part by the shield T—T'.

A continuous tunnel 4 with a smooth cylindrical wall may play the part of a shield and also of a rolling or sliding track in relationship with a faired body adapted to move axially thereof, whereby it may move at very high speeds with a minimum resistance while transporting mail after the manner of pneumatic tubes, or goods or passengers under conditions of safety and regularity which are higher than those of conventional aircraft. If the speed is to be so high that air resistance of rotating wheels is prohibitive, the peripheral rim speed of the wheels being twice that of the carrier speed, the guiding and the support of the vehicle may be obtained through other means known per se such as shoes sliding on a lubrication film of a liquid such as oil, water, etc., or of gas or through electrodynamic levitation making use of the repulsion exerted between a field system including permanent magnet or electromagnetic shoes and conductor strips of greater or less breadth which extend along a tubular shield. The rapid travel of the magnetized shoes along the conductor strips sets up eddy currents in the surface layers of the conductive strips and thereby tends to float the carrier above the lower strips or rails of the tube.

Fig. 3 is a transverse cross-section of a tunnel or tube 4 in which a carrier or vehicle 1 is movable, the tube 4 acting as the shield in addition to its function as a guiding member. The radial ribs 3 are adapted to center the vehicle and are as thin as consistent with the necessity of mounting the shoes 5 which bear upon a fluid film on longitudinal strips 6, or which are repulsed from the strips 6 when the shoes are permanent magnets or electromagnets.

Furthermore, the well known similarity between the propagation of pressure waves through gases and at the surface of heavy liquids permits an extension of the invention to very high speed surface ships, such as vedettes, torpedo boats and the like. Such high speed vessels will develop no resistance due to radiated waves when, in accordance with the invention, more or less immersed panel-shaped shields are attached to the faired body or hull to intercept and to recover, as in the case of compressible fluids, the energy which would otherwise radiate in the form of waves and produce a supplementary resistance which is particularly important at very high speeds.

Figure 4:
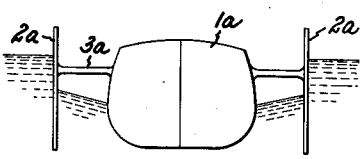
Figs. 4 and 5 are end elevations of boats with fairings embodying the invention.
Figure 5:
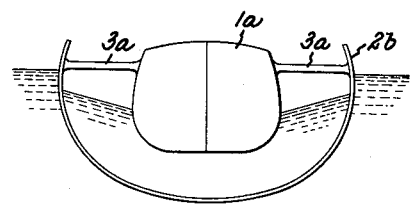

The shielding for a faired boat or vessel 1a may take the form of two flat vertical plates 2a, as shown in Fig. 4, which are secured to the boat by faired arms 3a which may or may not be immersed, or the shielding may take the form of a single plate 2b, as shown in Fig. 5, which extends along both sides of and beneath the hull. In either case, the elements of the shielding plate or plates are parallel to the axis of the hull and its direction of travel.

The high speed device may of itself constitute the fairing, for example in the case of a boat, or suitably shaped hollow shells may be secured to the device to provide the desired fairing or smooth surface contour. In the claims, the terms "sharply pointed" and "sharp-edged" as applied to the tip of the central body and to the ends of the cylindrical screen, respectively, are employed to exclude constructions of such bluntness as would give rise to shock waves during travel at speeds in the region of sonic and supersonic speed.

I claim:

1. A device adapted to travel at supersonic speeds without radiating pressure waves into space, said device consisting of an elongated body of revolution having a sharply pointed forward end of concave profile which flares rearwardly with reversed profile to merge smoothly into the maximum cross-section portion of the body, a cylindrical shield coaxial with said body and spaced radially therefrom, the inner and outer surfaces of said shield being surfaces of revolution having as their generatrix lines parallel to the axis of said elongated body and the forward inner surface of the shield being a surface of revolution meeting the outer cylindrical surface of the shield at a sharp edge, and faired arms securing said shield to said body, said arms constituting the sole objects affecting flow of a fluid medium through the interspace between said elongated body and said cylindrical shield, and the forward portion of said shield being constructed and arranged to reflect towards the rearward portion of said flaring section of said body pressure waves originating at said sharply pointed forward end and the adjacent flaring section as a result of high speed displacement in a fluid medium.

2. A device as recited in claim 1, wherein the flaring forward end of said body and the forward portion of said shield constitute an annular convergent nozzle within which the flow of an elastic fluid simulates the fluid flow in the second convergent part of a supersonic nozzle with a double throat.

3. A device as recited in claim 2, wherein the contour of the leading portion of said body is arbitrary in advance of that point from which the elementary pressure wave is reflected back to be dissipated, with a pressure rise, in the stream of fluid medium flowing axially within the annular space of minimum cross-section between said body and said shield.

4. A device as recited in claim 1, wherein said body and shield are symmetrical with respect to a transverse plane perpendicular to the axis of said body at the midpoint thereof.

5. A fairing for travel at supersonic speed, said fairing comprising an elongated central body having the surface of a body of revolution with a forward portion consisting of a sharply pointed forward end of concave profile flaring smoothly through a portion of convex profile to merge into a central region of maximum cross-section, and means for reflecting back to said central body pressure waves radiated from said forward portion; said means comprising an imperforate cylindrical screen tube spaced radially from said central body and having an outer surface defined by an outer generating line parallel to the axis of said central body, the forward end of said screen tube being sharp-edged and located in a plane transverse to the axis of said central body at a point between said sharply pointed forward end and said region of maximum cross-section.

6. A fairing as recited in claim 5, wherein the forward inner surface of said screen tube is a surface of revolution forming a sharp edge with the outer cylindrical surface of said screen tube.

7. A fairing as recited in claim 6, wherein the front and rear portions of said central body and of said screen tube are symmetrical about a transverse plane normal to the axis of the central body at the midpoint thereof.

8. A fairing as recited in claim 5, wherein faired radial arms secure said screen tube to said central body.

GEORGES DARRIEUS.

(References on following page)

References Cited in the file of this patent

UNITED STATES PATENTS

| Number | Name | Date |
|---|---|---|
| 1,233,610 | Schleicher | July 17, 1917 |
| 2,364,197 | Dee | Dec. 5, 1944 |
| 2,410,538 | Walton | Nov. 5, 1946 |
| 2,419,866 | Wilson | Apr. 29, 1947 |

FOREIGN PATENTS

| Number | Country | Date |
|---|---|---|
| 402,687 | France | Sept. 3, 1909 |
| 763,758 | France | Feb. 19, 1934 |

OTHER REFERENCES

"Experiments at Supersonic Speed on a Biplane of the Busemann Type," A. Ferri.

"Aircraft Engineering" of August 1946, pages 261–263.

"Popular Science," February 1946, page 120.